(12) United States Patent
Dixon et al.

(10) Patent No.: US 7,846,233 B2
(45) Date of Patent: Dec. 7, 2010

(54) LEACHING PROCESS FOR COPPER CONCENTRATES

(75) Inventors: David G. Dixon, Delta (CA); Alain F. Tshilombo, Burnaby (CA)

(73) Assignee: The University of British Columbia, Vancouver (CA)

( * ) Notice: Subject to any disclaimer, the term of this patent is extended or adjusted under 35 U.S.C. 154(b) by 1240 days.

(21) Appl. No.: 11/141,043

(22) Filed: Jun. 1, 2005

(65) Prior Publication Data

US 2005/0269208 A1   Dec. 8, 2005

Related U.S. Application Data (60) Provisional application No. 60/576,301, filed on Jun. 3, 2004.

(51) Int. Cl.
*C25C 1/12* (2006.01)

(52) U.S. Cl. ............... 75/373; 75/753; 75/411; 205/568

(58) Field of Classification Search ........... 205/568; 75/411, 753, 373
See application file for complete search history.

(56) References Cited

U.S. PATENT DOCUMENTS

| | | | |
|---|---|---|---|
| 3,103,414 A | 9/1963 | Thornhill | |
| 3,264,099 A | 8/1966 | Johnson | |
| 3,544,306 A | 12/1970 | McGauley | |
| 3,959,436 A * | 5/1976 | Watts | ............ 423/27 |
| 4,091,070 A | 5/1978 | Riggs et al. | |
| 4,152,142 A | 5/1979 | Schlitt, III et al. | |
| 4,236,918 A | 12/1980 | Narain | |
| 4,243,411 A | 1/1981 | Anderson | |
| 4,256,553 A | 3/1981 | Baczek et al. | |
| 4,331,635 A * | 5/1982 | Arbiter et al. | ............ 423/33 |
| 4,634,467 A | 1/1987 | Ochs | |
| 5,795,466 A | 8/1998 | Kelebek et al. | |
| 5,993,635 A * | 11/1999 | Hourn et al. | ............ 205/568 |
| 6,110,253 A | 8/2000 | Kohr et al. | |
| 6,159,435 A | 12/2000 | Nguyen | |

(Continued)

FOREIGN PATENT DOCUMENTS

WO    WO 01/31072    5/2001

OTHER PUBLICATIONS

Abraitis, P.K., et al., Acid leaching and dissolution of major sulphide ore minerals: processes and galvanic effects in complex systems, Mineralogical Magazine, Apr. 2004, vol. 68(2), pp. 343-351.

(Continued)

*Primary Examiner*—Harry D Wilkins, III
*Assistant Examiner*—Zulmariam Mendez
(74) *Attorney, Agent, or Firm*—Oyen Wiggs Green & Mutala LLP (57) ABSTRACT

A method of leaching copper from copper sulphide-containing concentrates, such as chalcopyrite, includes using pyrite as a catalyst for ferric reduction in order to eliminate passivation of the chalcopyrite surface, the process being carried out under conditions whereby the pyrite is not materially oxidized, for example by maintaining the operating solution potential at a suitable level. The leaching is carried out in an acidic sulphate medium and may include oxidation by oxygen-containing gas. The leached copper is then recovered, for example by solvent extraction and electrowinning. The leaching process can result in the virtually complete extraction of copper at atmospheric pressure in as little as four hours.

43 Claims, 8 Drawing Sheets

U.S. PATENT DOCUMENTS

| | | | |
|---|---|---|---|
| 6,277,341 | B1 | 8/2001 | Pinches et al. |
| 6,319,389 | B1 | 11/2001 | Fountain et al. |
| 6,537,440 | B1 | 3/2003 | Richmond et al. |
| 6,592,644 | B2 | 7/2003 | Beckmann |
| 6,607,474 | B2 | 8/2003 | Chowdhury |
| 6,656,722 | B1 | 12/2003 | Ruitenberg et al. |

OTHER PUBLICATIONS

Dutrizac, J.E., et al., The effect of name impurities on the rate of chalcopyrite dissolution, Canadian Metallurgical Quarterly, vol. 12, No. 4 (1973), pp. 409-420.

Linge, H.G., Reactivity Comparison of Australian Chalcopyrite Concentrates in Acidified Ferric Solution, Hydrometallurgy, 2 (1976/1977), pp. 219-233.

Mehta, A.P. et al. 1983, Fundamental Studies of the Contribution of Galvanic Interaction to Acid-Bacterial Leaching of Mixed Metal Sulfides, Hydrometallurgy, 9 (1983), pp. 235-256.

Ahonen et al.: "Catalytic effects of silver in the microbiological leaching of finely ground chalcopyrite-containing ore materials in shake flasks" Hydrometallurgy, Vo. 24, No. 2, 1990, pp. 219-236.

* cited by examiner

LEACHING PROCESS FOR COPPER CONCENTRATES

CROSS-REFERENCE TO RELATED APPLICATION

This application claims the benefit of provisional application No. 60/576,301, filed Jun. 3, 2004.

TECHNICAL FIELD

The invention pertains to methods for leaching copper from copper sulphide-containing concentrates. More particularly it pertains to a hydrometallurgical process for the extraction of copper from a copper sulphide-containing concentrate, including mixed sulphide concentrates, in particular from concentrates containing chalcopyrite ($CuFeS_2$).

BACKGROUND

As is known in the art, chalcopyrite is a semiconductor, and therefore corrodes electrochemically in oxidizing solutions. In ferric sulphate media, the overall leaching reaction is as follows:

$$CuFeS_2(s)+2Fe_2(SO_4)_3(a) \rightarrow CuSO_4(a)+5FeSO_4(a)+2S^0(s)$$

This reaction may be represented as a combination of anodic and cathodic half-cell reactions:

Anodic half-cell reaction: $CuFeS_2 \rightarrow Cu^{2+}+Fe^{2+}+2S^0+4e^-$

Cathodic half-cell reaction: $4Fe^{3+}+4e^- \rightarrow 4Fe^{2+}$

The fundamental problem with chalcopyrite oxidation is that the chalcopyrite mineral surfaces are passivated (i.e., they become resistant to electrochemical breakdown) at solution potentials above a certain level (generally considered to be about 550 to 600 mV vs Ag/AgCl). It is widely held that this results from the formation of some sort of passivating film on the mineral surface that most likely consists of an altered, partially Fe-depleted form of chalcopyrite. Because of this, most investigators have assumed that it is the anodic half-cell reaction (i.e., the mineral breakdown reaction) that limits the overall rate of leaching. It would be desirable to provide a leaching process in which such passivation is reduced.

SUMMARY

The present inventors have discovered that it is primarily the cathodic half-cell reaction (i.e., ferric reduction) that is slow on the chalcopyrite surface, and have determined that the presence of an alternative catalytic surface for ferric reduction in electrical contact with chalcopyrite provides a mechanism whereby the passivation of chalcopyrite can be eliminated in a mixed iron sulphate solution.

In broad terms, the method of the invention includes the steps of providing a catalyst for the leaching process, e.g. pyrite ($FeS_2$), and leaching copper from the copper sulphide-containing concentrates in the presence of the catalyst. The leaching step is carried out in an acidic sulphate leach solution, for example a ferric sulphate leach solution, under conditions whereby the pyrite is not materially oxidized. The process may include the application of an oxidizing agent, e.g. oxygen in the form of air or $O_2$ gas.

Once the copper is leached from the concentrate, it is desirable to recover the copper from the leached solution. Preferably, a solid-liquid separation step is first carried out, separating a liquid solution containing the copper from a solid residue. The copper can then be recovered from the liquid solution by conventional means, such as solvent extraction and electrowinning (SX-EW), or by reduction with hydrogen gas.

In the process, a significant amount (by mass percent) of pyrite is present with the concentrate during leaching. Under appropriate conditions, virtually complete copper extraction can be achieved by this method in as little as four hours. It is believed that this is the shortest time within which anyone has leached chalcopyrite to completion under atmospheric conditions in sulphate media without the aid of ultrafine grinding.

According to one embodiment, the invention provides a method of recovering cooper from chalcopyrite concentrate. A mixture is provided comprising particulate chalcopyrite concentrate and particulate pyrite. The weight ratio of the chalcopyrite to the pyrite in the mixture is in the range of less than 3:1 to 1:20. Copper is leached from the mixture in an acidic sulphate leach solution, in the presence of an oxygen-containing gas, under conditions whereby the pyrite is substantially unoxidized, to produce a solution containing copper ions. The leached copper is then recovered from the solution.

According to another embodiment, the invention provides a further method of recovering copper from chalcopyrite concentrate. Particulate chalcopyrite concentrate and particulate pyrite are added to an acidic sulphate leach solution. The weight ratio of the chalcopyrite to the pyrite being added is in the range of less than 3:1 to 1:20. The copper is leached from the chalcopyrite in the leach solution, in the presence of an oxygen-containing gas, under conditions whereby the pyrite is substantially unoxidized, to produce a solution containing copper ions. The leached copper is then recovered from the solution.

According to yet another embodiment, the invention provides a further method of recovering copper from chalcopyrite concentrate. Particulate chalcopyrite concentrate and particulate pyrite are added to an acidic sulphate leach solution. Copper is leached from the chalcopyrite concentrate in the leach solution, in the presence of an oxygen-containing gas, under conditions whereby the pyrite is substantially unoxidized, while maintaining the pyrite at a concentration of at least 10 grams per liter of the leach solution by the addition of pyrite to the leach solution. This produces a solution containing copper ions, and the leached copper is recovered from the solution.

BRIEF DESCRIPTION OF THE DRAWINGS

FIGS. 6(*a*) and (*b*) are graphs of copper concentration versus reaction time and solution potential versus reaction time, respectively, showing the effect of pulp density.

FIGS. 7(*a*) and (*b*) are graphs of copper concentration versus reaction time and solution potential versus reaction time, respectively, showing the effect of impeller speed and the choice of air or oxygen as the primary oxidant.

FIGS. 8(*a*) and (*b*) are graphs of copper concentration versus reaction time and solution potential versus reaction time, respectively, showing the effect of acid concentration, pulp density and the chalcopyrite:pyrite mass ratio.

DETAILED DESCRIPTION

In the method described herein, pyrite is an effective and convenient provider of an alternative surface for ferric reduction; effective, because pyrite mass additions between two and four times that of chalcopyrite give final copper recoveries typically two to four times higher than without pyrite, and convenient, because such pyrite levels are often already present in chalcopyrite ores. Hence, the requisite pyrite level in the reactor may be achieved in many cases simply by floating a bulk pyrite/chalcopyrite concentrate and sending this directly to the leaching circuit. This has the added advantage of minimizing copper losses in the flotation circuit. If the pyrite levels in the ore are inadequate, pyrite may be added to the chalcopyrite concentrate and/or a pyrite recycle stream may be implemented. The present leaching process is accordingly carried out using a mixture comprising particulate chalcopyrite concentrate and particulate pyrite, it being understood that reference herein to such a "mixture" includes both compositions in which the pyrite is specifically added to the concentrate and those where it is already present in the concentrate at a sufficient level and therefore does not have to be added.

Pyrite is most effective as a galvanic catalyst when it behaves strictly as a cathode. Hence, the leaching process is carried out under conditions in which the pyrite is not oxidized to any substantial extent, i.e. not to an extent that is material to the effective functioning of the process, and preferably not at all. This can be done by maintaining the solution potential below a certain level. The maximum operating solution potential (i.e. the potential at which the process is carried out) is typically less than about 500 mV versus Ag/AgCl (all solution potentials stated herein are expressed in relation to the standard Ag/AgCl reference electrode). Preferably, the operating solution potential is between about 350 mV and 520 mV and more preferably between about 380 mV and 480 mV. If the solution potential (which tends to rise as leaching progresses) exceeds these values, the rate of chalcopyrite leaching diminishes significantly.

In order not to exceed a certain solution potential in a ferric leaching reactor, one must ensure that the supply of ferric does not exceed the demand. In the present system, this means that the overall leaching reaction:

must be intrinsically faster than the ferrous oxidation reaction with dissolved oxygen gas:

Assuming that the proper set of operating variables has been identified in order to maximize the intrinsic leaching rate (i.e., $CuFeS_2:FeS_2$ ratio, particle size, acid level, and temperature), then it is a matter of engineering design to select appropriate levels of pulp density, oxygen flow rate, and agitation intensity such that the supply of ferric does not exceed the demand in any part of the leaching circuit.

The present process may be carried out on a batch basis or as a continuous process, the latter being preferred. In batch mode, as the level of chalcopyrite in the leaching reactor (and, concurrently, the demand for oxidant) diminishes with time, it may be necessary to regulate the flow of oxygen to the reactor to prevent the solution potential from exceeding the desired maximum, particularly when pure oxygen gas rather than air is used. Alternatively, in a continuous process consisting of a number of leaching tanks in series, one would simply supply oxygen to each tank at the appropriate rate. This may be facilitated in practice by supplying pure oxygen or oxygen-enriched air to the first one or two tanks and air to the remaining tanks, or perhaps running the final tank without oxygen.

Also, in batch mode, it is desirable that the leach solution have an initial iron level of at least 1 gram per litre to initiate the leaching process. However, this is of no importance in a continuous process, where the breakdown of chalcopyrite will generate sufficient dissolved iron at steady state.

Figure 1:
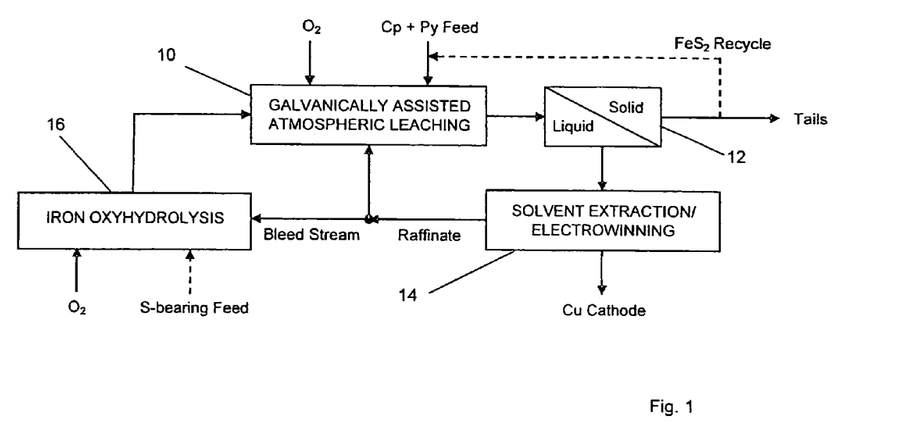
FIG. 1 is a flow sheet for the process of leaching copper concentrate.

An example of a process flowsheet for carrying out the process on a continuous basis, and recovering the extracted copper, is shown in FIG. 1. The process involves three basic steps, namely, leaching, copper recovery (by SX-EW), and iron rejection and optional makeup acid generation (by oxyhydrolysis). Optional flow streams are indicated in dotted lines. In the leach reactor, in step 10 of the process, chalcopyrite is leached selectively at low potential in the presence of the pyrite catalyst, producing a solid sulphur residue, while ferrous is oxidized to ferric with dissolved oxygen gas:

Because the solution potential is maintained low, the iron dissolved from chalcopyrite will remain mostly as ferrous. This reaction consumes two moles of acid per mole of copper.

Following the leaching process, copper can be extracted from the leach solution. After a solid-liquid separation (step 12), producing a liquid solution containing the copper, the liquid solution is preferably subjected in step 14 to conventional solvent extraction and electrowinning to produce pure copper cathodes according to the following overall reaction:

In order to reject iron and to recover the remainder of the acid, a raffinate bleed stream is subjected to oxyhydrolysis with oxygen gas at step 16 to oxidize ferrous to ferric and form a stable ferric precipitate. One preferred method involves the formation of hematite thus:

This process would involve a small amount of oxygen gas, which could be supplied from a low-cost vapour pressure swing absorption (VPSA) plant. The hematite could simply pass through the leach circuit and be rejected to the tails in step 12. The steady state concentration of dissolved iron entering the leach circuit would be inversely related to the proportion of raffinate bled to oxyhydrolysis (step 16).

In principle, the overall chemistry of the process as envisaged does not require acid:

Overall process: $CuFeS_2(s)+5/4O_2(g) \rightarrow Cu(s)+\frac{1}{2}O_2(g)+\frac{1}{2}Fe_2O_3(s)+2S^0(s)$ (Note that the oxygen on the left must be supplied, while the oxygen on the right is lost to the atmosphere.) However, some make-up acid may be required to account for losses in tailings and bleed streams. This make-up acid can be produced during iron oxyhydrolysis by feeding a small portion of sulphur in the form of metal sulphides, including, but not necessarily limited to, chalcopyrite and pyrite, and/or elemental sulphur, or mixtures thereof, into the oxyhydrolysis reactor:

Chalcopyrite oxidation: $CuFeS_2(s)+5/4O_2(g)+H_2O(l) \rightarrow CuSO_4(a)+\frac{1}{2}Fe_2O_3(s)+H_2SO_4(a)$ Pyrite oxidation: $FeS_2(s)+7/2O_2(g)+2H_2O(l) \rightarrow \frac{1}{2}Fe_2O_3(s)+2H_2SO_4(a)$ Sulphur oxidation: $S^0(s)+3/2O_2(g)+H_2O(l) \rightarrow H_2SO_4(a)$ Alternatively, additional acid could be manually added as necessary. Hence, the only significant operating costs associated with this process are for the electricity required for electrowinning the copper and for generating oxygen.

In the present process, a bulk concentrate containing a chalcopyrite:pyrite ratio of between about 4:1 and about 1:20 is subjected to the leaching process. Alternatively, the chalcopyrite:pyrite ratio is between about 1:1 and 1:10, or between about 1:2 and 1:4. The provenance of the pyrite present in the concentrate is not important. Additional pyrite can be added from an external source or recycled to make up the desired ratio in the bulk concentrate or, if appropriate, a bulk concentrate can be made from an ore sample that is naturally rich in pyrite, with further enrichment from an external pyrite source if necessary. It will be understood that other copper or base metal sulphides can also be present in the concentrate being leached.

The leaching process may be run at temperatures between about 50° C. and the melting point of sulphur (about 110 to 120° C.). Alternatively, it is run at a temperature of between about 70° C. and the melting point of sulphur. The leaching process can be run under any pressure between about atmospheric pressure and those pressures attainable in an autoclave. Preferably, it is run under about atmospheric pressure.

The leaching process can be run under an atmosphere of oxygen-containing gas such as air, oxygen-enriched air, substantially pure oxygen, or any combination thereof, in a series of leaching tanks. Given the relatively modest oxygen requirements of the process, this oxygen gas can also be supplied by a low-cost VPSA plant, or by a more conventional cryogenic oxygen plant for larger applications.

In this specification and claims, the term P80 describes the particle size at which 80% of the mass of material will pass through the specified size of mesh. For use in the leaching process, the P80 particle size of the chalcopyrite concentrate can vary over a wide range.

For example, a P80 particle size of about 210 microns can be used. Preferably, the chalcopyrite particle size is below about 106 microns, or alternatively below about 75 microns, or alternatively below about 38 microns. The pyrite particle size may be the same as or less than the chalcopyrite particle size. Alternatively the P80 particle size of both the chalcopyrite concentrate and the pyrite may be in the range of 38 to 106 microns. Ultrafine grinding of the concentrate and/or the pyrite is not necessary, though the process will work with ultrafine materials.

The leach can be run at any pulp density that will seem reasonable to one skilled in the art. For example, the pulp density may be about 9% or higher. Higher pulp densities facilitate the control of solution potential by ensuring high ferric demand, and may also enhance the effectiveness of the galvanic couple between pyrite and chalcopyrite.

According to the overall leach stoichiometry given above, at least two moles of sulphuric acid should theoretically be added to the leach for every mole of copper recovered from chalcopyrite. In practice, however, the acid requirement may fluctuate depending on the exact composition of the concentrate and the degrees of sulphur and ferrous oxidation and iron precipitation that occur during the leach. Preferably, at least 1.5 moles of sulphuric acid are added for every mole of copper recovered and more preferably at least 2 moles of sulphuric acid are added for every mole of copper. Higher levels of sulphuric acid in solution generally enhance the leach kinetics.

EXAMPLES

Leaching reactions were carried out at atmospheric pressure on a variety of concentrate/pyrite compositions and under various conditions, as described below, and measurements of copper recovery and solution potential were made at intervals up to 24 hours. The results are shown graphically in FIGS. 2 to 8. In those figures, each curve is given a label in the legend which indicates in parentheses the source, amount, and particle size of the minerals involved, followed by the conditions under which the test was performed. The meaning of these labels is as follows. First, in the parentheses:

| | |
|---|---|
| A | denotes chalcopyrite mineral from a source in Australia (23.6% Cu, 28.1% Fe, 28.7% S) |
| O | denotes chalcopyrite mineral from a source in Ontario, Canada (24.1% Cu, 32.4% Fe, 31.2% S) |
| P | denotes pyrite mineral from a source in Peru (0.3% Cu, 45.3% Fe, 51.4% S) |
| U | denotes pyrite mineral from a source in Utah, USA (<0.1% Cu, 42.9% Fe, 47.9% S) |
| 10 | denotes 10 g of mineral added to the reactor, for example |
| F | denotes the fine particle size fraction (−38 μm diameter) |
| M | denotes the medium particle size fraction (+38-75 μm diameter) |
| C | denotes the coarse particle size fraction (+75-106 μm diameter) |

Then, following the parentheses:

| | |
|---|---|
| E | precedes the initial solution potential (in mV vs the Ag/AgCl reference electrode) |
| Fe | precedes the level of total Fe in solution initially in g/L (baseline value: 5 g/L) |
| Ac | precedes the level of $H_2SO_4$ in solution initially in g/L (baseline value: 10 g/L) |
| V | precedes the initial volume of solution in mL (baseline value: 1500 mL) |
| I | precedes the impeller rotation speed in rpm (baseline value: 750 rpm) |
| Oxy | denotes the use of oxygen gas instead of air (baseline oxidant: Air) |

These last five indicators only appear in the label if some value other than the baseline was used. This is not meant to imply that the baseline values are optimal, but simply reflects the fact that most of the tests were run under these conditions. Hence, for example, the following legend label:

(A30M U60F) E462 Ac20 I1200 Oxy denotes 30 g of medium-grind "Australia" chalcopyrite and 60 g of fine-grind "Utah" pyrite added to 1500 mL of solution (baseline value, implied) with an initial Fe concentration of 5 g/L (baseline value, implied) and an initial $H_2SO_4$ concentration of 20 g/L exhibiting an initial solution potential of 462 mV vs Ag/AgCl, run under an impeller speed of 1200 rpm with pure oxygen gas as the oxidant.

In each figure, the legends are arranged in order of decreasing copper conversion from top to bottom, and the same symbols are applied to the corresponding potential curves.

Example 1

Effect of Pyrite

Figure 2A:
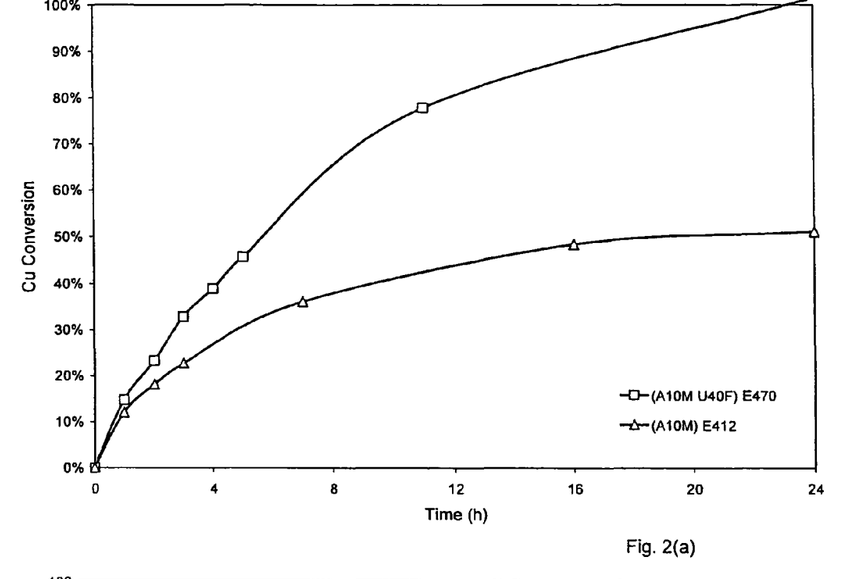
FIGS. 2(a) and (b) are graphs of copper conversion versus reaction time and solution potential versus reaction time, respectively, for leaching reactions carried out with and without pyrite.
Figure 2B:
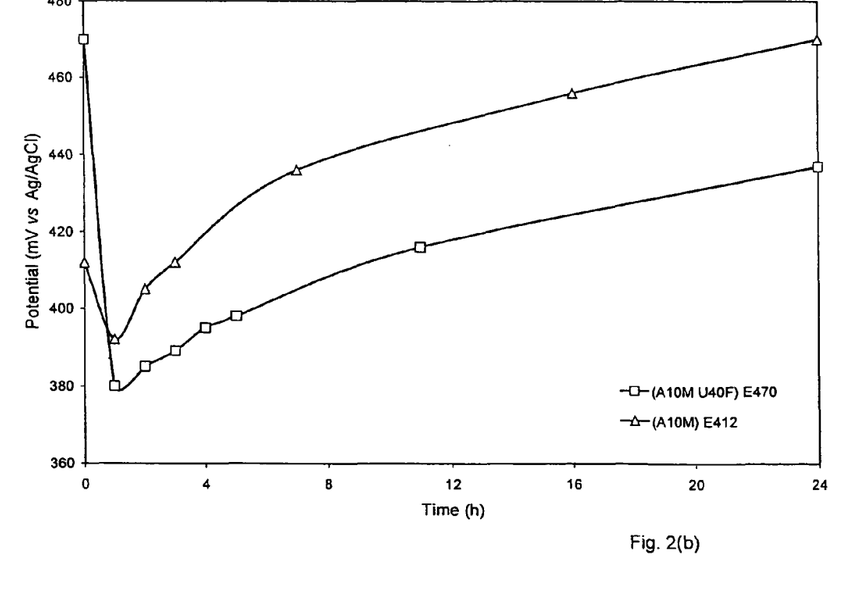

As shown in FIGS. 2(a) and (b), pyrite has a significant effect on the ultimate recovery of copper from chalcopyrite. In this particular instance, a chalcopyrite:pyrite ratio of 1:4 ensures complete copper recovery in about 24 hours under the baseline conditions, while only about 50% of the copper is recovered in the absence of pyrite before leaching ceases entirely. Even though the test with pyrite started at a significantly higher potential, the presence of pyrite quickly pulled the potential to a level well below the other test and held it there for the duration. No other form of potential control was required.

Example 2

Effect of Particle Size and Initial Solution Potential

Figure 3A:
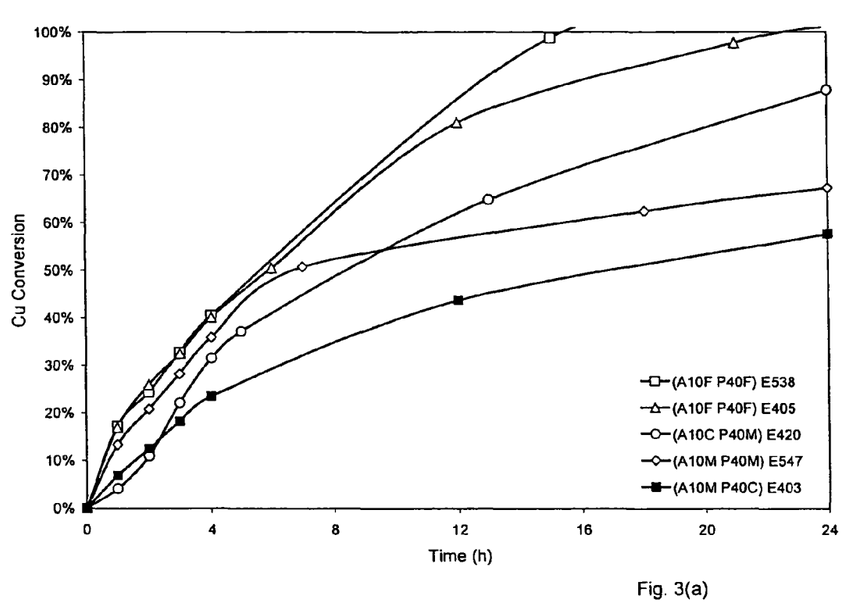
FIGS. 3(a) and (b) are graphs of copper concentration versus reaction time and solution potential versus reaction time, respectively, showing the effect of mineral particle size and initial solution potential.
Figure 3B:
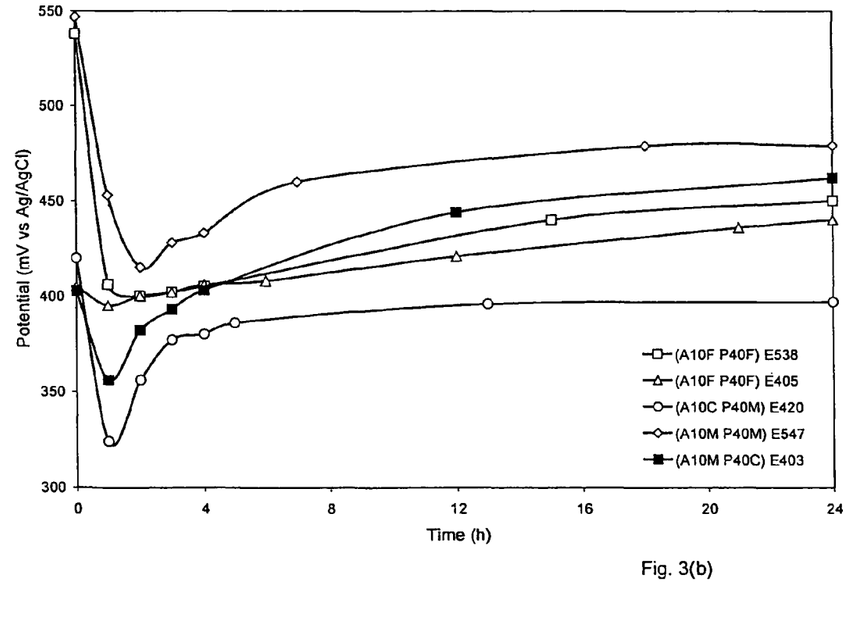

The results of tests comparing the effects of particle size and initial solution potential are shown in FIGS. 3(a) and (b). These five tests were all run under the baseline conditions with the same amounts of the same minerals. Hence, they offer the clearest comparison of the effects of particle size.

These tests show that the particle size of the pyrite has a much more significant effect than that of the chalcopyrite. In every case, copper recovery decreases with increasing pyrite particle size. However, comparing the third (coarse-grind chalcopyrite—medium-grind pyrite) and fourth (medium-grind chalcopyrite—medium-grind pyrite) curves, we see that decreasing the chalcopyrite particle size without also decreasing the pyrite particle size has a detrimental effect on copper conversion. This result is completely at odds with conventional wisdom regarding the effect of chalcopyrite particle size on leaching efficacy (where very fine, or even ultrafine, grinding is considered necessary). The reasons for this behaviour are subtle. As already mentioned, the success of the technology rests on having a sufficient amount of pyrite surface area available to support the entire cathodic reaction on behalf of chalcopyrite. With insufficient pyrite surface area, the chalcopyrite must support at least a portion of the cathodic process in order to provide a large enough electron sink for its anodic breakdown reaction. When the pyrite surface area is inadequate, there will be a certain potential above which the chalcopyrite also becomes (at least partly) cathodic. Once this potential is reached, the chalcopyrite begins to exhibit 'passive' behaviour. This explains why the fourth test passivated after 8 hours, while the third test did not.

Figure 4A:
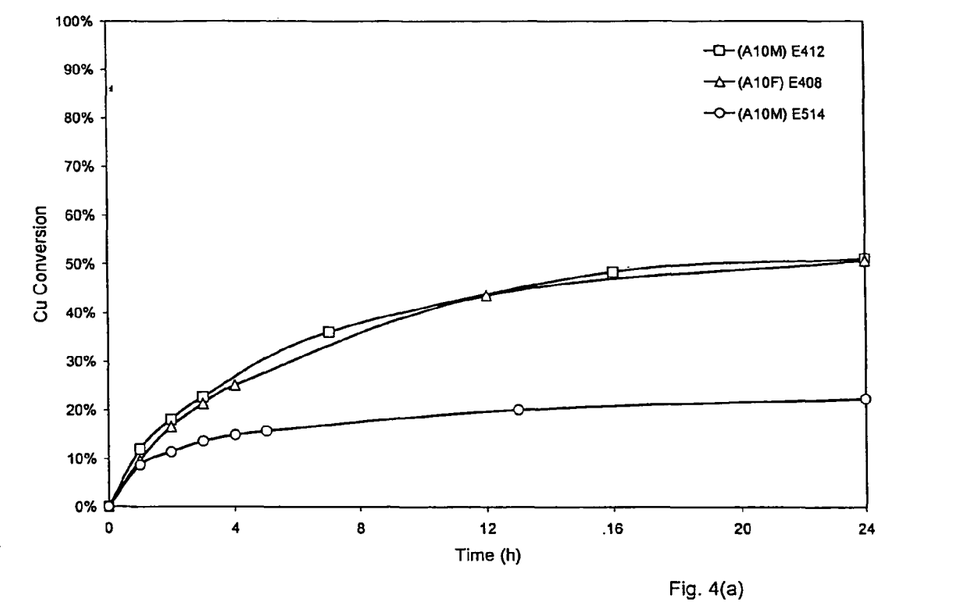
FIGS. 4(a) and (b) are graphs of copper concentration versus reaction time and solution potential versus reaction time, respectively, showing the effect of mineral particle size and initial solution potential in the absence of pyrite.
Figure 4B:
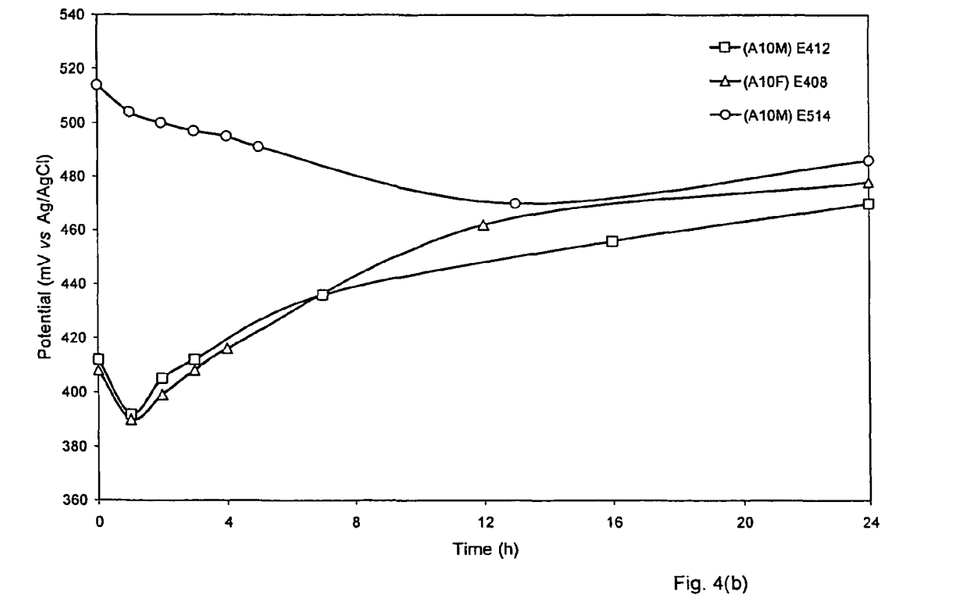

In contrast to these results, the initial potential can have a dramatic influence on the results when chalcopyrite is leached in the absence of pyrite, while the particle size is again perhaps not that important, as shown in FIG. 4. The tests started at low potential performed identically, even though one involved fine-grind chalcopyrite and the other involved medium-grind chalcopyrite, while the test started at high potential passivated much sooner and released less than half of the copper of the other tests after 24 hours.

Example 3

Effect of Pyrite Source

Figure 5A:
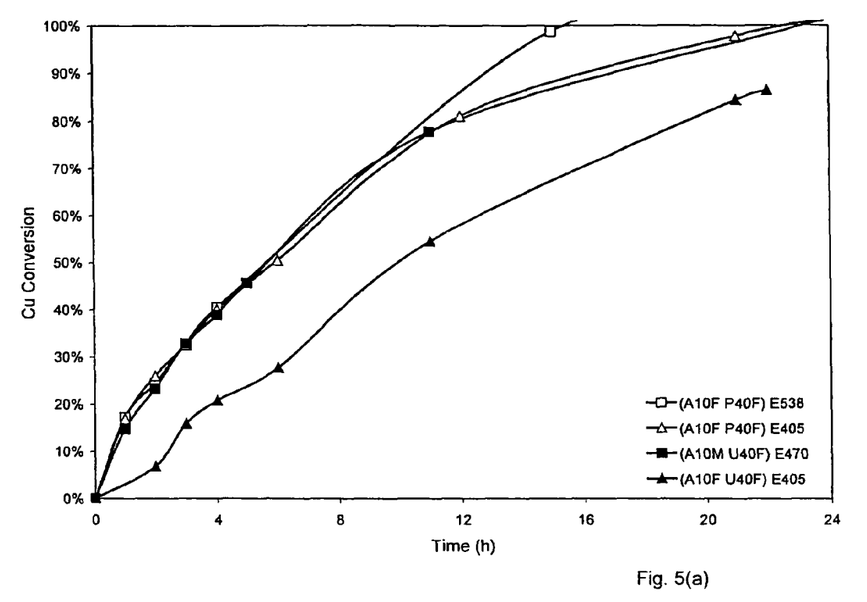
FIGS. 5(a) and (b) are graphs of copper concentration versus reaction time and solution potential versus reaction time, respectively, showing the effect of different sources of pyrite.
Figure 5B:
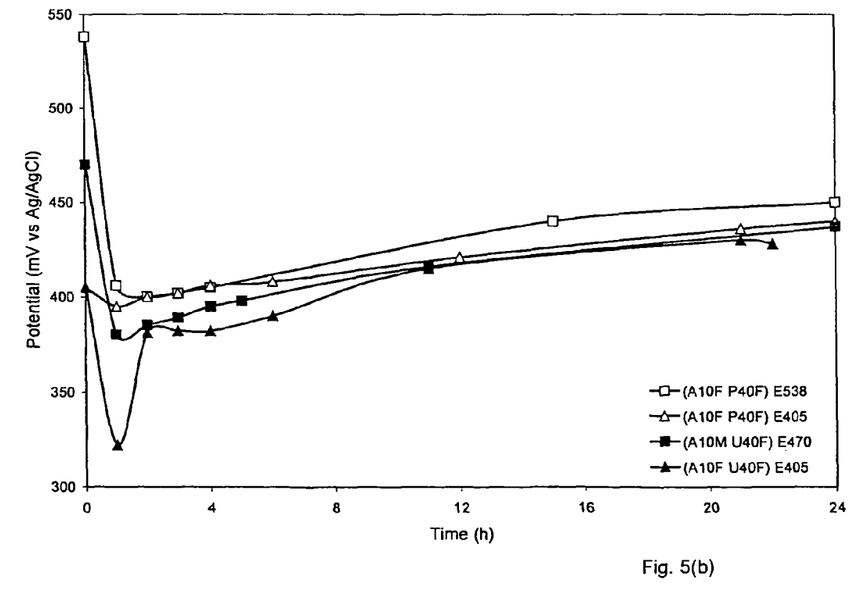

The effect of the source of the pyrite is shown in FIGS. 5(a) and (b). (Those tests using "Peru" pyrite are shown with open symbols, and those using "Utah" pyrite are shown with filled symbols.)

Comparing the two tests with square symbols, it makes very little difference which pyrite is used (although the "Peru" test used fine-grind chalcopyrite while the "Utah" test used medium-grind chalcopyrite). However, comparing the two tests with triangular symbols, the "Peru" pyrite seems to have outperformed the "Utah" pyrite. Indeed, the test involving the latter exhibited a lag period at the beginning during which the solution potential dipped to very low levels (almost down to 300 mV). However, after this initial episode, its performance was very similar to the other tests. It may be that there was a certain proportion of marcasite or pyrrhotite in the "Utah" sample which was subject to oxidation initially. In any case, the problem was eliminated by starting the tests using "Utah" pyrite at a slightly higher potential (around 470 mV instead of around 400 mV). Under these conditions, the two pyrite samples performed more or less identically.

Example 4

Effect of Pulp Density

Figure 6A:
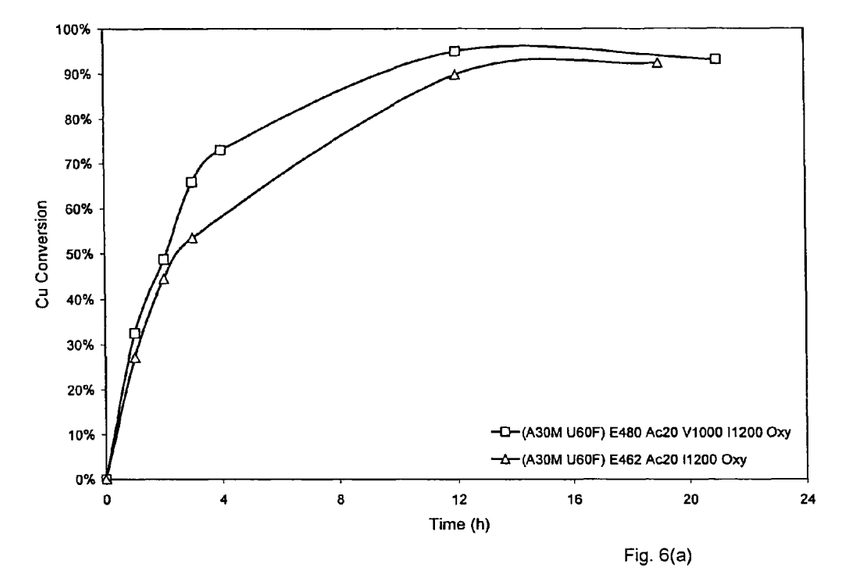
Figure 6B:
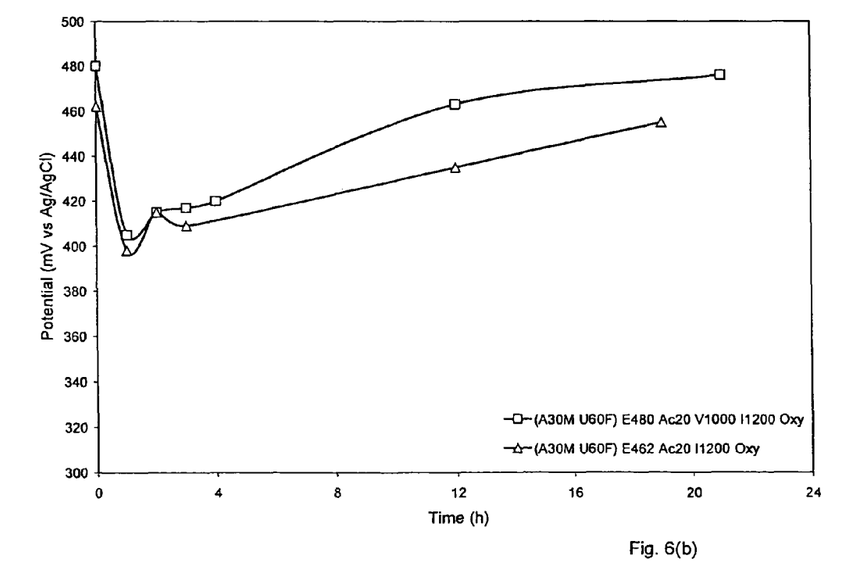

The effect of pulp density is shown in FIGS. 6(a) and (b). Increases in pulp density were achieved by simply using a smaller volume of solution. In this case, the test run in the baseline solution volume of 1500 mL had a pulp density of 6% solids, while the test run in 1000 mL of solution had a pulp density of 9% solids. The results show a slight benefit with increasing pulp density. This is useful, since the capital cost of a leaching plant decreases proportionally with increasing pulp density.

Example 5

Effects of Impeller Speed and Primary Oxidant

Figure 7A:
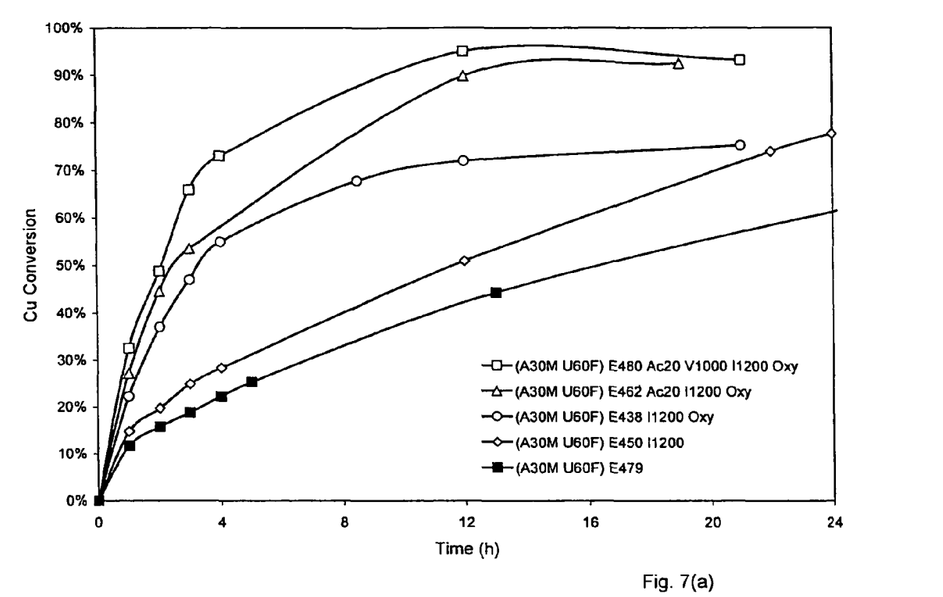
Figure 7B:
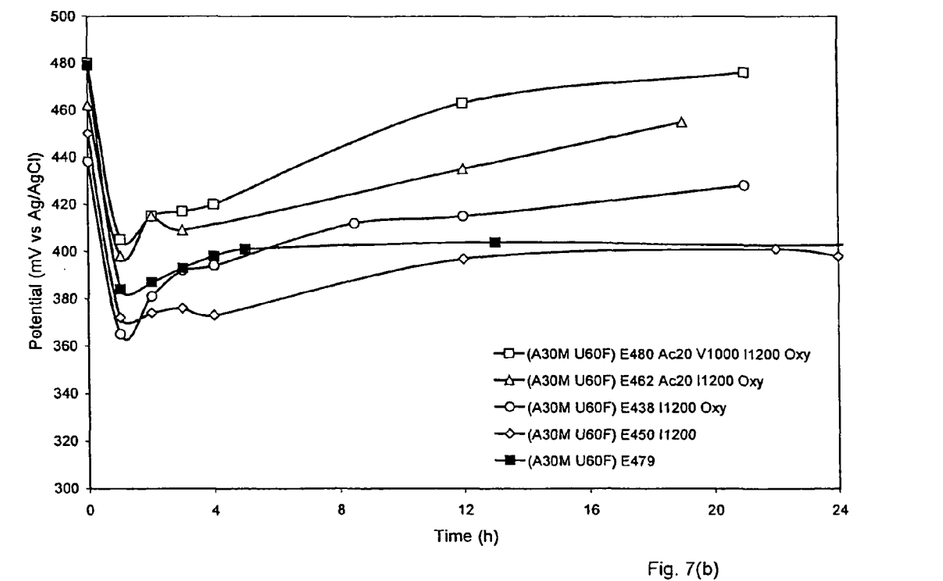

The effects of impeller speed and the choice of primary oxidant are shown in FIGS. 7(a) and (b) Each of these tests used 30 g of medium-grind chalcopyrite and 60 g of fine-grind pyrite. The test run under the baseline conditions achieved only about 62% copper recovery after 24 hours. After this test, it was realized that the rate of gas-liquid mixing was inadequate for tests involving such large amounts of chalcopyrite. Increasing the speed to 1200 rpm increased the copper recovery to nearly 78% after 24 hours. However, it was also suspected at this point that the rate of gas-liquid mixing was also limited by the low oxygen partial pressure of the air as well as stirring speed. Switching to oxygen was extremely beneficial, allowing the leach to achieve its full kinetic potential. Again, however, noting that copper recovery reached a plateau at about 75%, it was realized that insufficient acid was being added to bring the leach to completion according to process stoichiometry. (This problem was also exacerbated by the fact that increasing the rate of gas-liquid mixing also increased the yield of elemental sulphur at the expense of sulphate.) Doubling the level of acid in solution remedied this situation. Finally, increasing the pulp density by decreasing the amount of solution brought about a slight additional improvement, as mentioned before.

However, even under the best conditions, the system shown in FIG. 7 is not leaching quite to completion. The reason for this may be that the ratio of chalcopyrite to pyrite (1:2) is insufficient under the highly oxygenated conditions of these tests. There are two possible remedies to this situation. The first is to decrease the rate of gas-liquid mixing during the latter stages of copper recovery. This would occur quite naturally in a continuous multi-tank leaching circuit, simply by adding oxygen only to the first one or two tanks, and air to the remaining tanks. The other obvious remedy is to add more pyrite. The effect of doing this is shown in FIG. 8.

Example 6

Effect of Pyrite, Pulp Density, and Acid

Figure 8A:
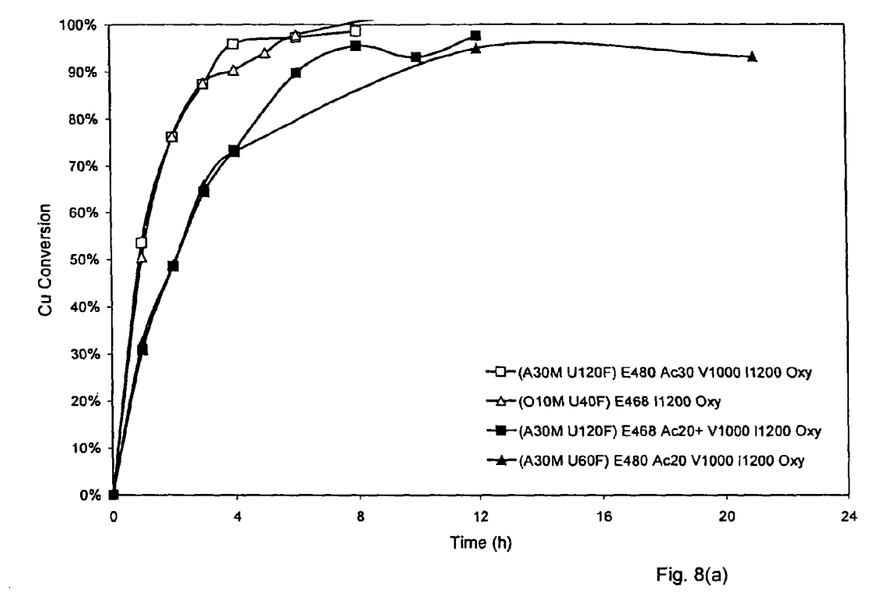
Figure 8B:
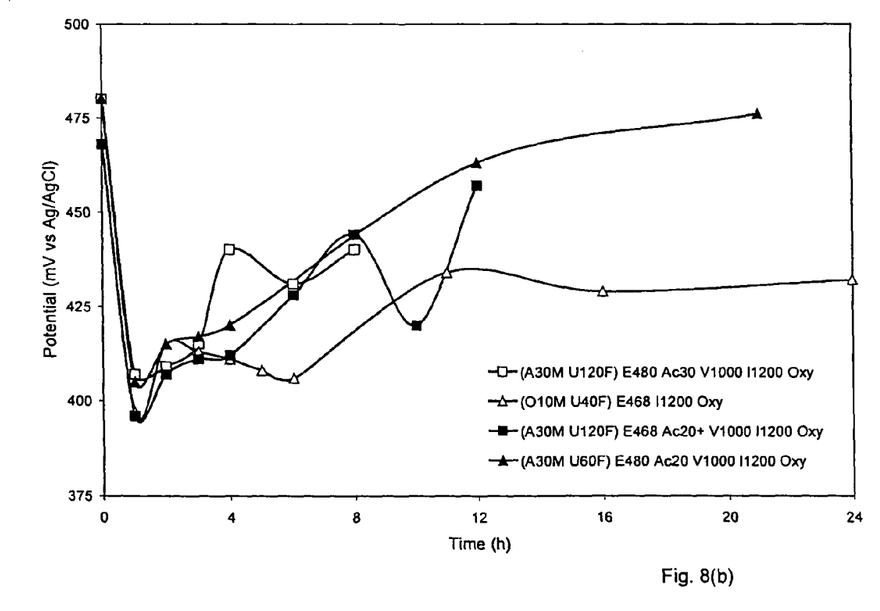

The tests summarized in FIGS. 8(*a*) and (*b*) show the true potential of the process. The most successful test shown in FIG. 7 is the least successful test shown here. This may have more to do with the level of acid in solution rather than the chalcopyrite:pyrite mass ratio. With the test denoted "Ac20+", the pyrite addition was doubled but the test was started with the same concentration of $H_2SO_4$ (20 g/L, or about 1.25 moles of acid per mole of copper). The results are virtually identical up to about 4 hours. At the 4 hour mark, about 7.5 g of additional acid was added to the "Ac20+" test (hence the "+"), and this had a significant beneficial effect on copper recovery. Another 18 g of acid was added after 7 hours, but had no additional effect.

The next test was identical in every respect except that 30 g of acid (about 1.9 moles of acid per mole of copper) was added initially. This had the effect of dramatically increasing the leaching rate such that the leach was essentially complete within 4 hours. This test is compared with the only test using "Ontario" chalcopyrite, run at a pulp density 11 times lower with the same chalcopyrite:pyrite mass ratio of 1:4, and at the baseline acid concentration of 10 g/L (the same molar ratio of acid to copper). The results are virtually identical. This confirms that the pulp density can take any value desired based on economic and practical considerations without adversely affecting the efficacy of the leach.

Why simply increasing the initial concentration of acid should have had such a large effect on leaching kinetics is uncertain. However, the most likely explanation is that higher acid concentration increases the kinetics of ferric reduction on the pyrite surface, thus having a catalytic effect on the galvanic couple. There is also some evidence that increasing the acid concentration raises the solution potential where pyrite begins to be oxidized. Another possibility is that the higher acid concentration prevents the precipitation of basic ferric salts such as jarosite on the mineral surfaces which may impede the leaching process.

Example 7

Optimization of Sulphur Yield

The final consideration is the yield of elemental sulphur. Results from some of the more successful tests are shown in Table 1. Elemental sulphur yields are consistently above 80%, and near luantitative yields are possible when oxygen gas is used as the primary oxidant.

TABLE 1

Calculated elemental sulphur yields from selected tests

| Test Legend | Final $S^0$ Yield | Final Cu recovery |
|---|---|---|
| (A10F P40F) E538 | 81% | 99% |
| (A10F P40F) E405 | 85% | 98% |
| (A10C P40M) E420 | 80% | 88% |
| (A20M P80M) E538 | 81% | 80% |
| (A10M U40F) E470 | 88% | 78% |
| (A10F U40F) E405 | 77% | 86% |
| (A20C U40F) E470 | 80% | 85% |
| (A20M U60F) E479 | 78% | 83% |
| (O10M U40F) E468 I1200 Oxy | 90% | 98% |
| (A30M U60F) E462 Ac20 I1200 Oxy | 96% | 92% |
| (A30M U60F) E480 Ac20 V1000 I1200 Oxy | 97% | 95% |

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true scope.

The invention claimed is:

1. A method of recovering copper from chalcopyrite concentrate, comprising the steps of:
 (a) providing a mixture comprising particulate chalcopyrite concentrate and particulate pyrite wherein the weight ratio of said chalcopyrite to said pyrite in said mixture is in the range of less than 3:1 to 1:20;
 (b) agitating an acidic sulphate leach solution with said mixture to suspend said particulate chalcopyrite concentrate and said particulate pyrite in said leach solution;
 (c) chemically leaching said copper from said mixture in said agitated leach solution, in the presence of an oxygen-containing gas, under conditions whereby said pyrite is substantially unoxidized, to produce a solution containing copper ions; and
 (d) recovering said leached copper from said solution.

2. A method according to claim 1 wherein said conditions comprise maintaining an operating potential of said leach solution such that said pyrite is substantially unoxidized.

3. A method according to claim 2 wherein said operating potential is 520 mV or less versus Ag/AgCl.

4. A method according to claim 2 wherein said operating potential is between 350 and 520 mV versus Ag/AgCl.

5. A method according to claim 2 wherein said operating potential is 480 mV or less versus Ag/AgCl.

6. A method according to claim 2 wherein said operating potential is between 380 and 480 mV versus Ag/AgCl.

7. A method according to claim 2 wherein said maintaining of said operating potential is carried out by means of selecting one or more of:
 (i) the ratio of said chalcopyrite to said pyrite;
 (ii) the particle size of said concentrate and said pyrite;
 (iii) the concentration of said acid; and
 (iv) the temperature of said leach solution.

8. A method according to claim 2 further comprising the step of selecting one or more of:
 (i) pulp density level;
 (ii) oxygen flow rate; and
 (iii) intensity of agitation of the leaching solution,
 to control said operating potential.

9. A method according to claim 1 wherein the ratio of said chalcopyrite to said pyrite in said mixture is in the range of 2:1 to 1:20.

10. A method according to claim 1 wherein the ratio of said chalcopyrite to said pyrite in said mixture is in the range of 1:1 to 1:10.

11. A method according to claim 1 wherein the ratio of said chalcopyrite to said pyrite in said mixture is in the range of 1:2 to 1:4.

12. A method according to claim 1 wherein said particles of chalcopyrite are of a P80 particle size of one of 210 microns or smaller.

13. A method according to claim 1 wherein said particles of chalcopyrite are of a P80 particle size of 106 microns or smaller.

14. A method according to claim 1 wherein said particles of chalcopyrite are of a P80 particle size of 75 microns or smaller.

15. A method according to claim 1 wherein said particles of chalcopyrite are of a P80 particle size of 38 microns or smaller.

16. A method according to claim 1 wherein said particles of chalcopyrite are of a P80 particle size of 38 to 106 microns.

17. A method according to claim 1 wherein said particles of pyrite are of a P80 particle size of 106 microns or smaller.

18. A method according to claim 1 wherein said particles of pyrite are of a P80 particle size of 75 microns or smaller.

19. A method according to claim 1 wherein said particles of pyrite are of a P80 particle size of 38 microns or smaller.

20. A method according to claim 1 wherein said particles of pyrite are of a P80 particle size of 38 to 106 microns.

21. A method according to claim 1 wherein the molar ratio of acid added in said leach solution to copper recovered from said chalcopyrite is greater than or equal to 1.5:1.

22. A method according to claim 1 wherein the molar ratio of acid added in said leach solution to copper recovered from said chalcopyrite is greater than or equal to 2:1.

23. A method according to claim 1 wherein said acid is sulphuric acid.

24. A method according to claim 1 wherein said leaching is carried out at a temperature in the range of about 50 to 120 degrees C.

25. A method according to claim 1 wherein said leaching is carried out at a temperature in the range of about 70 to 120 degrees C.

26. A method according to claim 1 wherein said leaching step is carried out at atmospheric pressure.

27. A method according to claim 1 wherein said leaching step is carried out at a pulp density of 9% solids or higher.

28. A method according to claim 1 wherein said oxygen-containing gas comprises air.

29. A method according to claim 1 wherein said oxygen-containing gas comprises oxygen or oxygen-enriched air.

30. A method according to claim 1 wherein said step of recovering leached copper comprises solvent extraction and electrowinning.

31. A method according to claim 29 wherein ferrous ions in a raffinate stream from said solvent extraction step are oxidized to ferric ions by oxygen gas and precipitated as a stable ferric salt.

32. A method according to claim 1 wherein said pyrite is present in an ore from which said concentrate is prepared.

33. A method according to claim 1 wherein said pyrite is not present in an ore from which said concentrate is prepared.

34. A method of recovering copper from chalcopyrite concentrate, comprising the steps of:
   (a) adding particulate chalcopyrite concentrate and particulate pyrite to an acidic sulphate leach solution, wherein the weight ratio of said chalcopyrite to said pyrite being added is in the range of less than 3:1 to 1:20;
   (b) agitating said leach solution to suspend said particulate chalcopyrite concentrate and said particulate pyrite in said leach solution;
   (c) chemically leaching said copper from said chalcopyrite in said agitated leach solution, in the presence of an oxygen-containing gas, under conditions whereby said pyrite is substantially unoxidized, to produce a solution containing copper ions; and
   (d) recovering said leached copper from said solution.

35. A method of recovering copper from chalcopyrite concentrate, comprising the steps of:
   (a) adding particulate chalcopyrite concentrate and particulate pyrite to an acidic sulphate leach solution;
   (b) agitating said leach solution to suspend said particulate chalcopyrite concentrate and said particulate pyrite in said leach solution;
   (c) chemically leaching said copper from said chalcopyrite concentrate in said agitated leach solution, in the presence of an oxygen-containing gas, under conditions whereby said pyrite is substantially unoxidized, while maintaining said pyrite at a concentration of at least 10 grams per liter of said leach solution by addition of pyrite to said leach solution, to produce a solution containing copper ions; and
   (d) recovering said leached copper from said solution.

36. A method according to claim 35 wherein said concentration of pyrite is at least 26.7 grams per liter of said leach solution.

37. A method according to claim 35 wherein said concentration of pyrite is at least 40 grams per liter of said leach solution.

38. A method according to claim 35 wherein said concentration of pyrite is at least 60 grams per liter of said leach solution.

39. A method according to claim 35 wherein at least some of said pyrite that is added is recycled pyrite obtained from said leach solution following a solid-liquid separation step.

40. A method according to claim 1 wherein said leaching step is carried out at a pressure above atmospheric pressure.

41. A method according to claim 34 wherein said ratio of said chalcopyrite to said pyrite is in the range of 2:1 to 1:20.

42. A method according to claim 1, wherein said step of agitating said leach solution comprises stirring said leach solution.

43. A method according to claim 42, wherein said stirring is done with an impeller.

* * * * *